United States Patent
Votaw et al.

(10) Patent No.: US 10,069,932 B2
(45) Date of Patent: Sep. 4, 2018

(54) USER-CONFIGURED RESTRICTIONS FOR ACCESSING ONLINE ACCOUNTS VIA DIFFERENT ACCESS METHODS

(71) Applicant: Bank of America Corporation, Charlotte, NC (US)

(72) Inventors: Elizabeth S. Votaw, Potomac, MD (US); William B. Belchee, Charlotte, NC (US); Michael P. Lynch, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 147 days.

(21) Appl. No.: 14/839,098

(22) Filed: Aug. 28, 2015

(65) Prior Publication Data

US 2017/0063925 A1    Mar. 2, 2017

(51) Int. Cl.
H04L 29/06 (2006.01)
H04L 29/08 (2006.01)
H04W 12/08 (2009.01)
H04W 88/02 (2009.01)

(52) U.S. Cl.
CPC ......... H04L 67/306 (2013.01); H04L 63/107 (2013.01); H04W 12/08 (2013.01); H04W 88/02 (2013.01)

(58) Field of Classification Search
None
See application file for complete search history.

(56) References Cited

U.S. PATENT DOCUMENTS

| | | | |
|---|---|---|---|
| 8,117,097 B2 | 2/2012 | Abbott | |
| 8,660,954 B2 | 2/2014 | Neto et al. | |
| 2009/0254656 A1* | 10/2009 | Vignisson | G06F 17/30867 709/224 |
| 2012/0239557 A1 | 9/2012 | Weinflash et al. | |
| 2015/0026026 A1 | 1/2015 | Calman et al. | |
| 2015/0026054 A1 | 1/2015 | Calman et al. | |
| 2015/0074825 A1* | 3/2015 | Blake | G06F 21/6245 726/28 |
| 2015/0121448 A1* | 4/2015 | Burch | H04L 63/20 726/1 |
| 2015/0178516 A1* | 6/2015 | Mityagin | G06F 21/6218 707/783 |
| 2015/0227729 A1* | 8/2015 | Grigg | G06F 21/31 726/7 |
| 2016/0014141 A1* | 1/2016 | Ganapathy | H04W 12/06 726/28 |
| 2016/0248781 A1* | 8/2016 | Grigg | G06F 21/31 |
| 2017/0359336 A1* | 12/2017 | Votaw | H04L 63/0838 |

* cited by examiner

Primary Examiner — Michael R Vaughan
(74) Attorney, Agent, or Firm — Michael A. Springs

(57) ABSTRACT

According to one embodiment, a system includes a memory comprising instructions, an interface, and a processor communicatively coupled to the memory and the interface. The interface is configured to receive one or more account access rules, the account access rules comprising restrictions on accessing an online account through one or more access methods, and receive, via a first access method, a request to access the online account. The processor is configured, when executing the instructions, to determine, based on the account access rules, whether the online account may be accessed using the first access method.

14 Claims, 5 Drawing Sheets

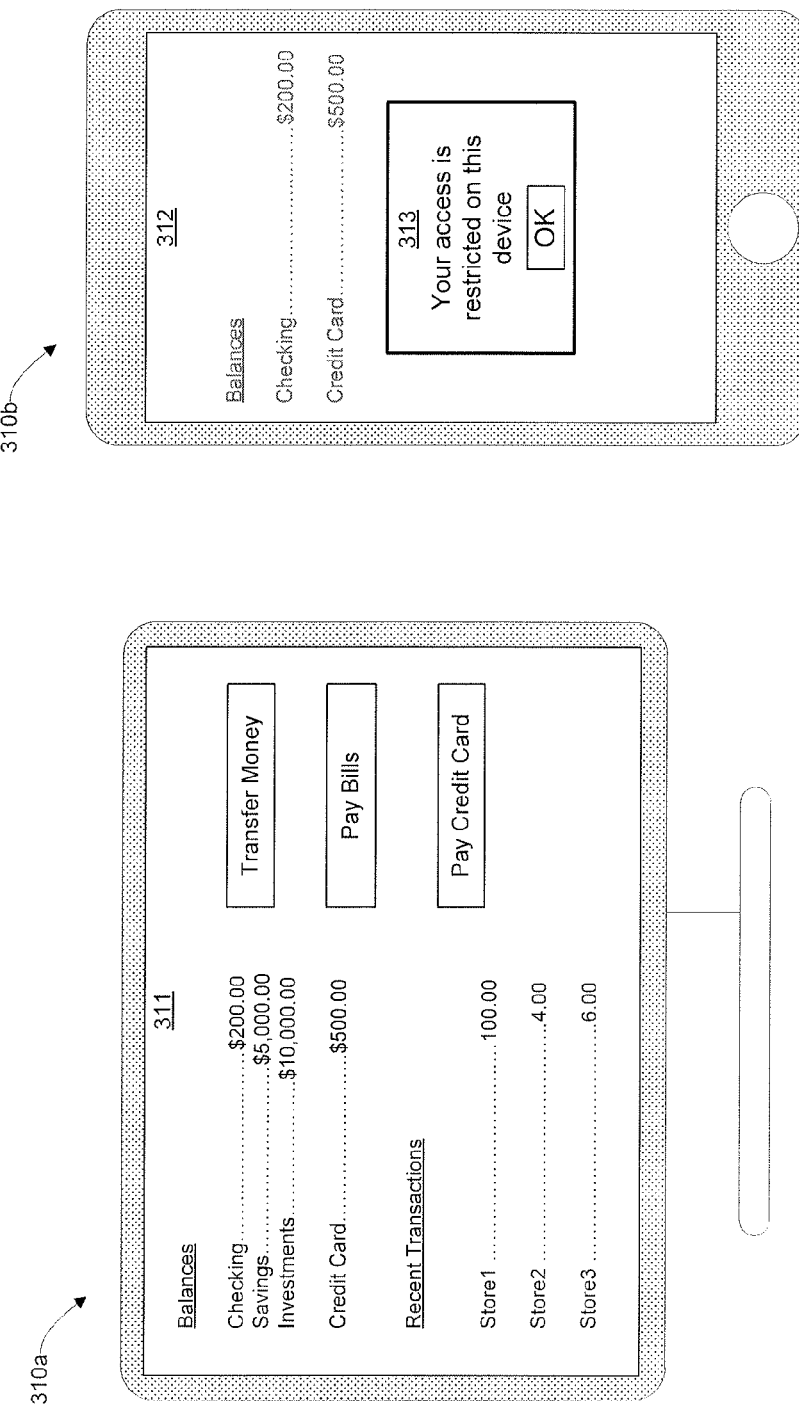

USER-CONFIGURED RESTRICTIONS FOR ACCESSING ONLINE ACCOUNTS VIA DIFFERENT ACCESS METHODS

TECHNICAL FIELD

This disclosure relates generally to online account management, and more particularly to configuring allowable access methods for one or more user accounts.

BACKGROUND

Typically, online accounts may be accessed using any user device having online connectivity. This may be troublesome for online accounts that comprise sensitive information, such as confidential information, or for online accounts that allow access to financial accounts. Such a wide range of access methods available to these types of accounts can lead to an increased likelihood of the information or money in the accounts being stolen or otherwise compromised.

SUMMARY OF THE DISCLOSURE

In accordance with the present disclosure, disadvantages and problems associated with allowing access to online accounts through multiple access methods may be reduced or eliminated.

According to one embodiment, a system is provided that includes a memory comprising instructions, an interface, and a processor communicatively coupled to the memory and the interface. The interface is configured to receive one or more account access rules, the account access rules comprising restrictions on accessing an online account through one or more access methods, and receive, via a first access method, a request to access the online account. The processor is configured, when executing the instructions, to determine, based on the account access rules, whether the online account may be accessed using the first access method.

According to one embodiment, a method is provided that comprises the steps of receiving one or more account access rules, the account access rules comprising restrictions on accessing an online account through one or more access methods, receiving, via a first access method, a request to access the online account, and determining, based on the account access rules, whether the online account may be accessed using the first access method.

According to one embodiment, a computer-readable medium comprising instructions is provided. The instructions are configured when executed to receive one or more account access rules, the account access rules comprising restrictions on accessing an online account through one or more access methods, receive, via a first access method, a request to access the online account, and determine, based on the account access rules, whether the online account may be accessed using the first access method.

Technical advantages of certain embodiments of the present disclosure include restricting access to online accounts based on the access method used, which may prevent unauthorized access to or misappropriation of information associated with online accounts. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which:

FIGS. 3A-3C illustrates an example system for configuring access methods for one or more user accounts in accordance with embodiments of the present disclosure;

DETAILED DESCRIPTION

The present disclosure describes systems and methods for configuring allowable access methods for one or more user accounts. More particularly, aspects of the present disclosure allow a user to restrict one or more ways of accessing or using their accounts. This can include entire restrictions for particular access methods, or restrictions on the types of functions that may be performed in the online account using the particular access methods. The access restrictions may be configured for certain periods of time, such as when the user will be out of town or otherwise not accessing the online account, or indefinitely.

In certain embodiments, the configuration of account access may be based on user device types. For example, an account owner may disallow access to an online account using any mobile device, such as a smartphone or tablet. In certain embodiments, the configuration may also be based on network connection type as well. For example, an account owner may disallow access to the online account when a user device is using a mobile communications network. In certain embodiments, the configuration of account access may also be based on account usernames, such as when an account may be accessed using multiple usernames. For example, using a first username, the account owner may disallow online access to an account for a second username that is also associated with the account. In certain embodiments, the configuration may also be on a per-account basis, such as for financial accounts. For example, an account owner may disallow access to financial investment accounts through online access methods, but may allow access to checking accounts through online access methods.

In one embodiment, for instance, a server receives a request from a user to access an online account. The request may include an indication of the access method, such as whether the request originates from a website using a browser or a mobile application installed on a device. Based on the access method indicated in the request, the server may determine whether the user may access the account using the access method. If the user may access the account, access is granted and one or more aspects of the online account are displayed to the user based on the restrictions in place (if any). Later, a request to perform an account function may be received. The server may then determine based on the access method whether the account function may be performed via the access method currently being used.

To facilitate a better understanding of the present disclosure, the following examples of certain embodiments are given. In no way should the following examples be read to limit, or define, the scope of the disclosure. Embodiments of the present disclosure and its advantages may be best understood by referring to FIGS. 1-5, where like numbers are used to indicate like and corresponding parts.

Figure 1:
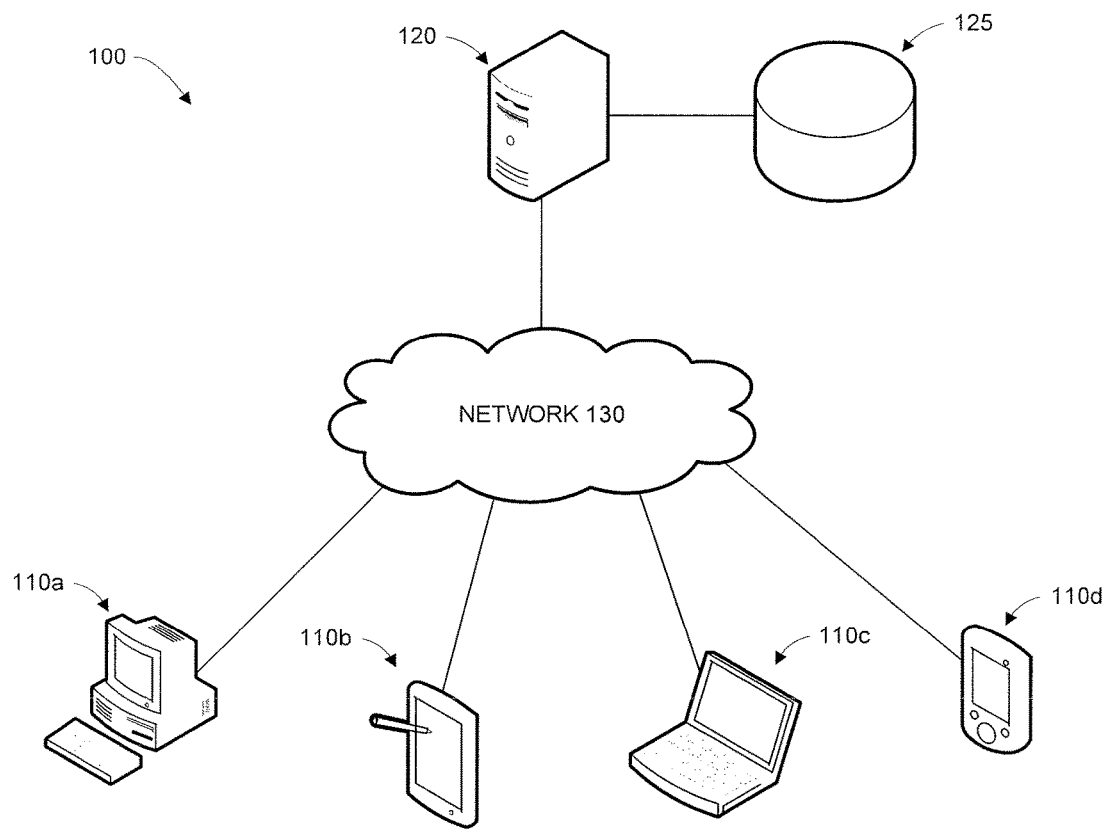
FIG. 1 illustrates an example system comprising user devices accessing a server over a network.

FIG. 1 illustrates an example system 100 comprising user devices 110 accessing server 120 over network 130. User devices 110 may include any suitable computing device that may be used to access one or more functions of server 120 through network 130. User devices 110 may include mobile computing devices with wireless network connection capabilities (e.g., wireless-fidelity (WI-FI), and/or BLUETOOTH capabilities). For example, user devices 120 may include laptop computers, smartphones, or tablet computers (such as tablet 110b, laptop 110c, and smartphone 110). User devices 110 may also include non-mobile devices such as desktop computers (such as desktop 110a). In certain embodiments, a number of different user devices 110 may be associated with a particular user. For example, a particular user may own each of desktop computer 110a, tablet 110, laptop 110c, and smartphone 110d, and may use such devices to access the one or more functions of server 120 as described herein.

Server 120 may provide one or more functions accessible to user devices 110, as described herein. For example, server 120 may provide users of user devices 110 access to one or more online accounts or account functions through a website, through a dedicated application installed on the user device 110, or through any other suitable means. In providing functionality to user devices 110, server 120 may access or otherwise utilize database 125.

Network 130 may include any suitable technique for communicably coupling user devices 110 with server 120. For example, network 130 may include an ad-hoc network, an intranet, an extranet, a virtual private network (VPN), a wired or wireless local area network (LAN), wide area network (WAN), metropolitan area network (MAN), a portion of the Internet, a portion of the Public Switched Telephone Network (PSTN), a portion of a cellular telephone network, or any combination thereof.

Modifications, additions, or omissions may be made to FIG. 1 without departing from the scope of the present disclosure. For example, FIG. 1 illustrates particular types of user devices 110. However, it will be understood that any suitable type of user device 110 may be used to access the one or more functions provided by server 120. As another example, although illustrated as a single server, server 120 may include a plurality of servers in certain embodiments. Similarly, although illustrated as a single database, database 125 may include a plurality of databases in some embodiments.

Figure 2:
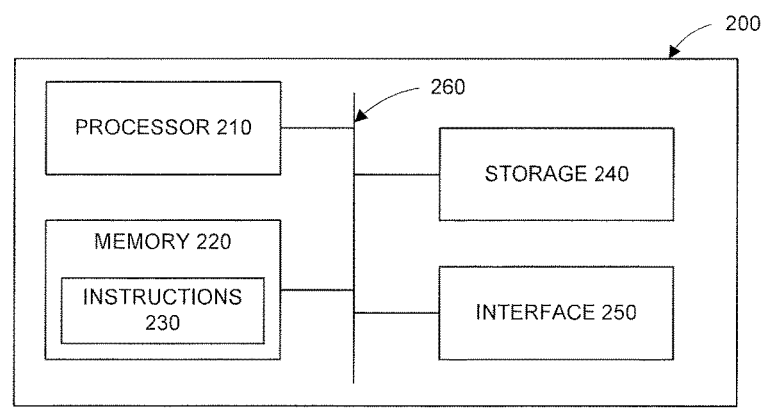
FIG. 2 illustrates an example computer system in accordance with embodiments of the present disclosure.

FIG. 2 illustrates an example computer system 200, in accordance with embodiments of the present disclosure. One or more aspects of computer system 200 may be used in user devices 110 or server 120 of FIG. 1. For example, each of user devices 110 or server 120 may include a computer system 200 in some embodiments. As another example, each of user devices 110 or server 120 may include two or more computer systems 200 in some embodiments.

Computer system 200 may include a processor 210, memory 220 comprising instructions 230, storage 240, interface 250, and bus 260. These components may work together to perform one or more steps of one or more methods (e.g. method 400 of FIG. 4) and provide the functionality described herein. For example, in particular embodiments, instructions 230 in memory 220 may be executed on processor 210 in order to process requests received by interface 250 using common function modules. In certain embodiments, instructions 230 may reside in storage 240 instead of, or in addition to, memory 220.

Processor 210 may be a microprocessor, controller, application specific integrated circuit (ASIC), or any other suitable device or logic operable to provide, either alone or in conjunction with other components (e.g., memory 220 and instructions 230) functionality according to the present disclosure. Such functionality may include processing application functions using remotely-located common function modules, as discussed herein. In particular embodiments, processor 210 may include hardware for executing instructions 230, such as those making up a computer program or application. As an example and not by way of limitation, to execute instructions 230, processor 210 may retrieve (or fetch) instructions 230 from an internal register, an internal cache, memory 220, or storage 240; decode and execute them; and then write one or more results of the execution to an internal register, an internal cache, memory 220, or storage 240.

Memory 220 may be any form of volatile or non-volatile memory including, without limitation, magnetic media, optical media, random access memory (RAM), read-only memory (ROM), flash memory, removable media, or any other suitable local or remote memory component or components. Memory 220 may store any suitable data or information utilized by computer system 200, including software (e.g., instructions 230) embedded in a computer readable medium, and/or encoded logic incorporated in hardware or otherwise stored (e.g., firmware). In particular embodiments, memory 220 may include main memory for storing instructions 230 for processor 210 to execute or data for processor 210 to operate on. In particular embodiments, one or more memory management units (MMUs) may reside between processor 210 and memory 220 and facilitate accesses to memory 220 requested by processor 210.

Storage 240 may include mass storage for data or instructions (e.g., instructions 230). As an example and not by way of limitation, storage 240 may include a hard disk drive (HDD), a floppy disk drive, flash memory, an optical disc, a magneto-optical disc, magnetic tape, a Universal Serial Bus (USB) drive, a combination of two or more of these, or any suitable computer readable medium.

Storage 240 may include removable or non-removable (or fixed) media, where appropriate. Storage 240 may be internal or external to computer system 200, where appropriate. In some embodiments, instructions 230 may be encoded in storage 240 in addition to, in lieu of, memory 220.

Interface 250 may include hardware, encoded software, or both providing one or more interfaces for communication (such as, for example, packet-based communication) between computer systems on a network (e.g., between employee devices 110 and back-end 130 of FIG. 1). As an example, and not by way of limitation, interface 250 may include a network interface controller (NIC) or network adapter for communicating with an Ethernet or other wire-based network and/or a wireless NIC (WNIC) or wireless adapter for communicating with a wireless network. Interface 250 may include one or more connectors for communicating traffic (e.g., IP packets) via a bridge card. Depending on the embodiment, interface 250 may be any type of interface suitable for any type of network in which computer system 200 is used. In some embodiments, interface 250 may include one or more interfaces for one or more I/O devices. One or more of these I/O devices may enable communication between a person and computer system 200. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these.

Bus 260 may include any combination of hardware, software embedded in a computer readable medium, and/or encoded logic incorporated in hardware or otherwise stored (e.g., firmware) to communicably couple components of computer system 200 to each other. As an example and not by way of limitation, bus 260 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 260 may include any number, type, and/or configuration of buses 260, where appropriate. In particular embodiments, one or more buses 260 (which may each include an address bus and a data bus) may couple processor 210 to memory 220. Bus 260 may include one or more memory buses.

Modifications, additions, or omissions may be made to FIG. 2 without departing from the scope of the present disclosure. For example, FIG. 2 illustrates components of computer system 200 in a particular configuration. However, any configuration of processor 210, memory 220, instructions 230, storage 240, interface 250, and bus 260 may be used, including the use of multiple processors 210 and/or buses 260. In addition, computer system 200 may be physical or virtual.

Figure 3A:
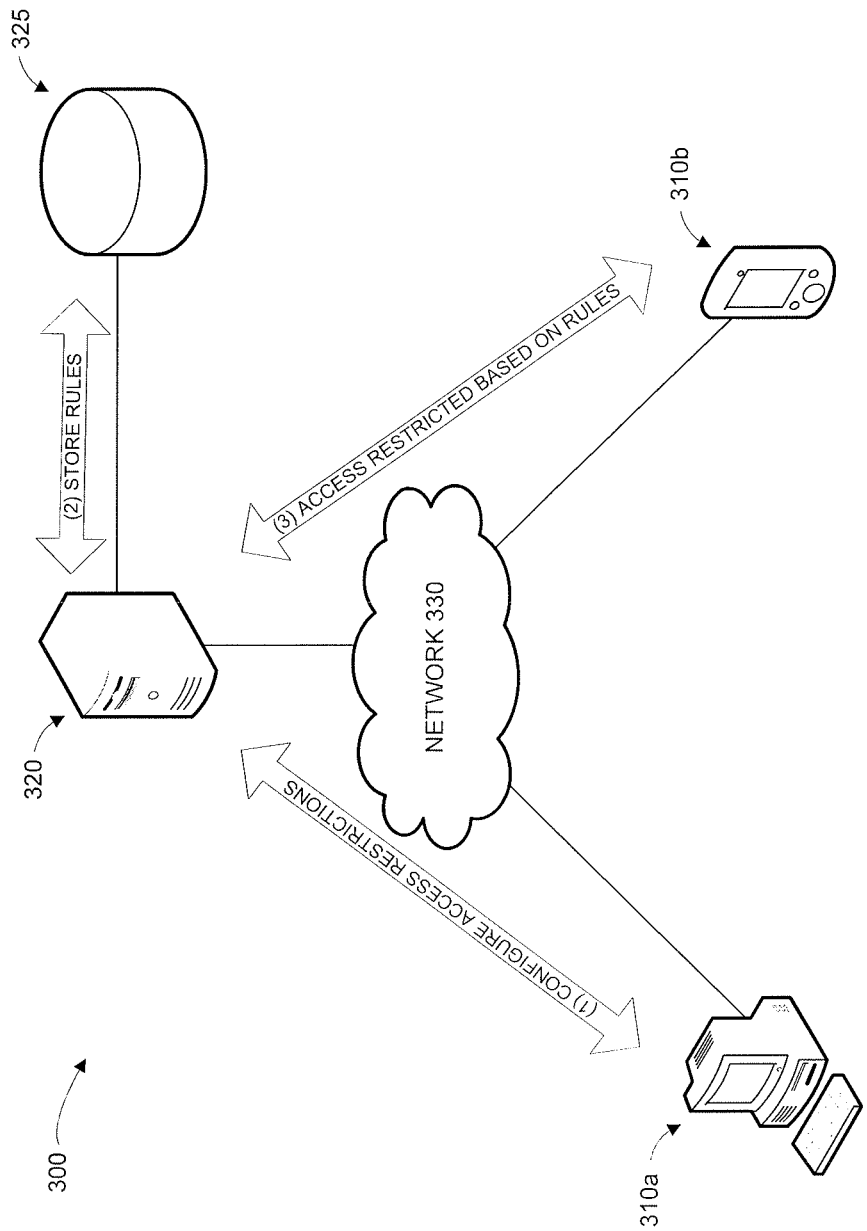

FIGS. 3A-3C illustrates an example system 300 for configuring access methods for one or more user accounts in accordance with embodiments of the present disclosure. In particular, FIG. 3A illustrates a user of desktop 310a configuring one or more restrictions on access to her online account serviced by server 320. The user of desktop 310a may configure, for example, access restrictions for mobiles devices such as smartphone 310b. As an example, user of desktop 310a may restrict mobile devices to read-only access to her online account. In other words, a user of smartphone 310b accessing the online account, such as through a website or mobile application, may only be allowed to view details of the online account and not change anything associated with the account (e.g., transfer money in a financial account). The user of desktop 310a may further restrict what aspects may be viewed on mobile devices, such as smartphone 310b. For example, a user of smartphone 310b may only be allowed to view balances of financial accounts, but not any confidential user information (e.g., account owner addresses and the like). Based on the one or more restrictions that user of desktop 310a has entered, server 320 may store the restrictions in database 325 as access rules for the account. Thus, when user of smartphone 310b attempts to access the online account, such access may be denied, limited, or otherwise restricted based on the access rules stored in database 325.

FIGS. 3B-3C illustrate example user interfaces 311 and 312 of desktop 310a and smartphone 310b, respectively, when accessing the same online account with mobile device restrictions placed on the account. As shown in interface 311 of FIG. 3B, the user of desktop 310a may be able to view all aspects of the online account, such as balances in each of the financial accounts associated with the online account or recent transactions with respect to such financial accounts. In addition, the user of desktop 310a may be able to perform one or more functions with respect to the online account, such as transfer money, pay bills, or pay toward a credit card as shown in FIG. 3B. However, as shown in interface 312 of FIG. 3C, a user of smartphone 310b may be restricted to only viewing balances of certain of the financial accounts associated with the online account based on the access rules stored in database 325 (which, as described above, are based on the restrictions entered by the account owner using desktop 310a). In addition, in certain embodiments, after logging into the online account, the user of smartphone 310b may be presented with a notification 313 that indicates that access to the online account is restricted on the particular device.

Modifications, additions, or omissions may be made to FIG. 3 without departing from the scope of the present disclosure. For example, FIG. 3 illustrates particular types of user devices 310 performing accessing an online account using server 320. However, it will be understood that any suitable type of user device 310 may be used to access the online account using server 320. As another example, although illustrated as a single server, server 320 may include a plurality of servers in certain embodiments. Similarly, although illustrated as a single database, database 325 may include a plurality of databases in some embodiments.

Figure 4:
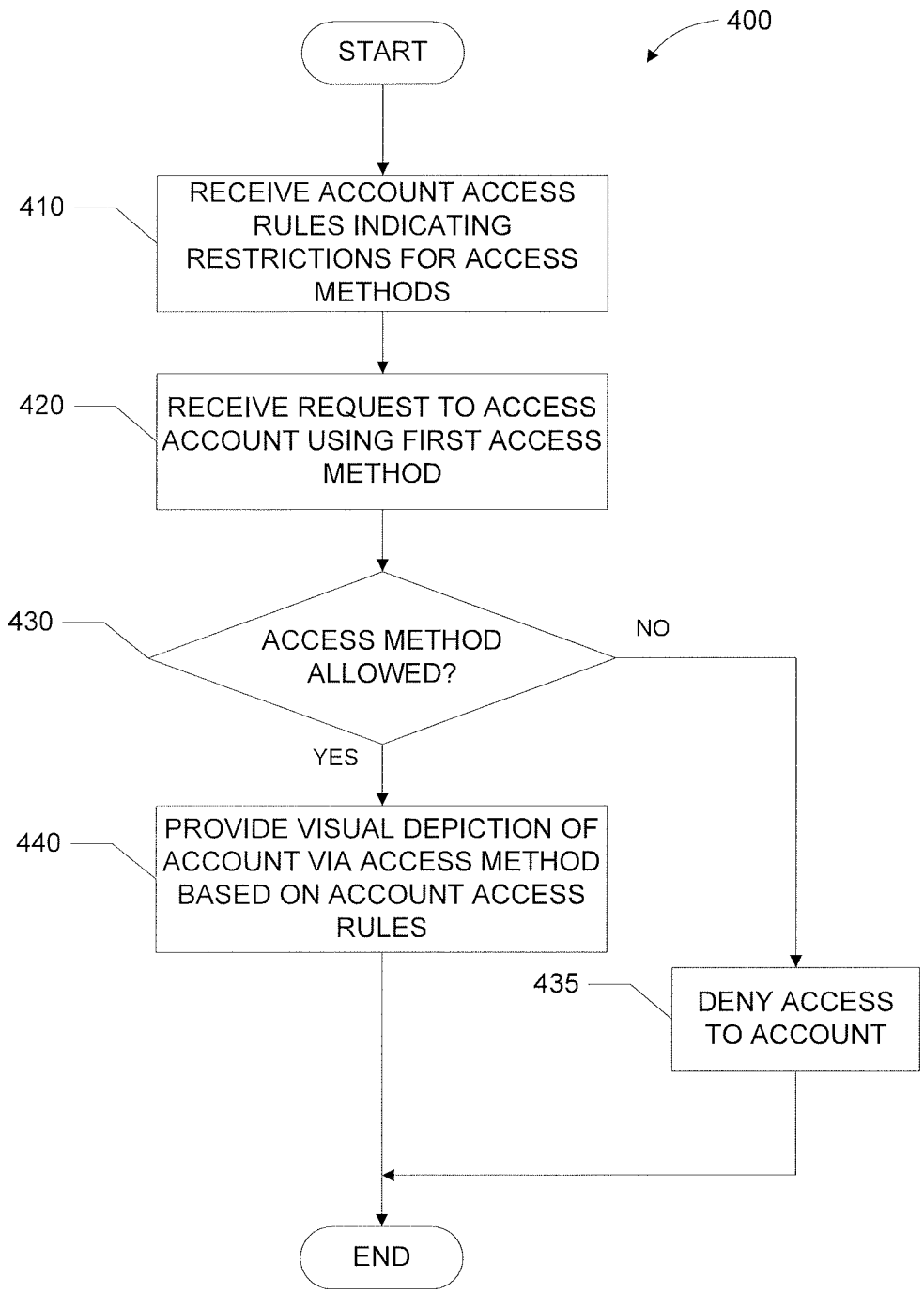
FIG. 4 illustrates an example method for accessing an online account in accordance with embodiments of the present disclosure.

FIG. 4 illustrates an example method 400 for accessing an online account in accordance with embodiments of the present disclosure. The method begins at step 410, where account access rules are received that indicated restrictions on accessing an online account for one or more access methods. This may include, for example, an account owner indicating her access method restriction preferences while accessing the online account using an account server (e.g., the owner using desktop 310a of FIG. 3A to enter such preferences to server 320, which services and provides functionality with respect to the online account). Based on the account owner's indicated access method restriction preferences, one or more access rules may be generated and stored in a database associated with the online account (e.g., stored in database 325 of FIG. 3A by server 320).

At step 420, a request to access the online account is received via a first access method. This may include a server receiving a login attempt from a user device (e.g., server 120 receiving a login attempt from a user device 110 of FIG. 1), such as a desktop, laptop, tablet, or smartphone. Based on the account access rules, it is determined at step 430 whether the online account may be accessed using the first access method. If not, access to the online account is denied at step 435. However, if access is allowed using the first access method, then a visual depiction of the account is provided based on the one or more account access rules at step 440. For example, referring to FIG. 3A, if the request to access the online account is received at server 320 via smartphone 310b, then server 320 may determine using the access rules stored in database 325 that smartphone 310b has restricted access rights to the online account. Accordingly, server 320 may provide a visual depiction to smartphone 310b according to the restrictions of the account access rules (e.g., providing a user interface to the online account similar to user interface 312 of FIG. 3C). In certain embodiments, a notification indicating that access to the online account is restricted may also be provided to the user device (e.g., notification 313 of FIG. 3C) along with the visual depiction of the online account.

Modifications, additions, or omissions may be made to method 400 without departing from the scope of the present disclosure. For example, the order of the steps may be performed in a different manner than that described and some steps may be performed at the same time. Additionally, each individual step may include additional steps without departing from the scope of the present disclosure.

Figure 5:
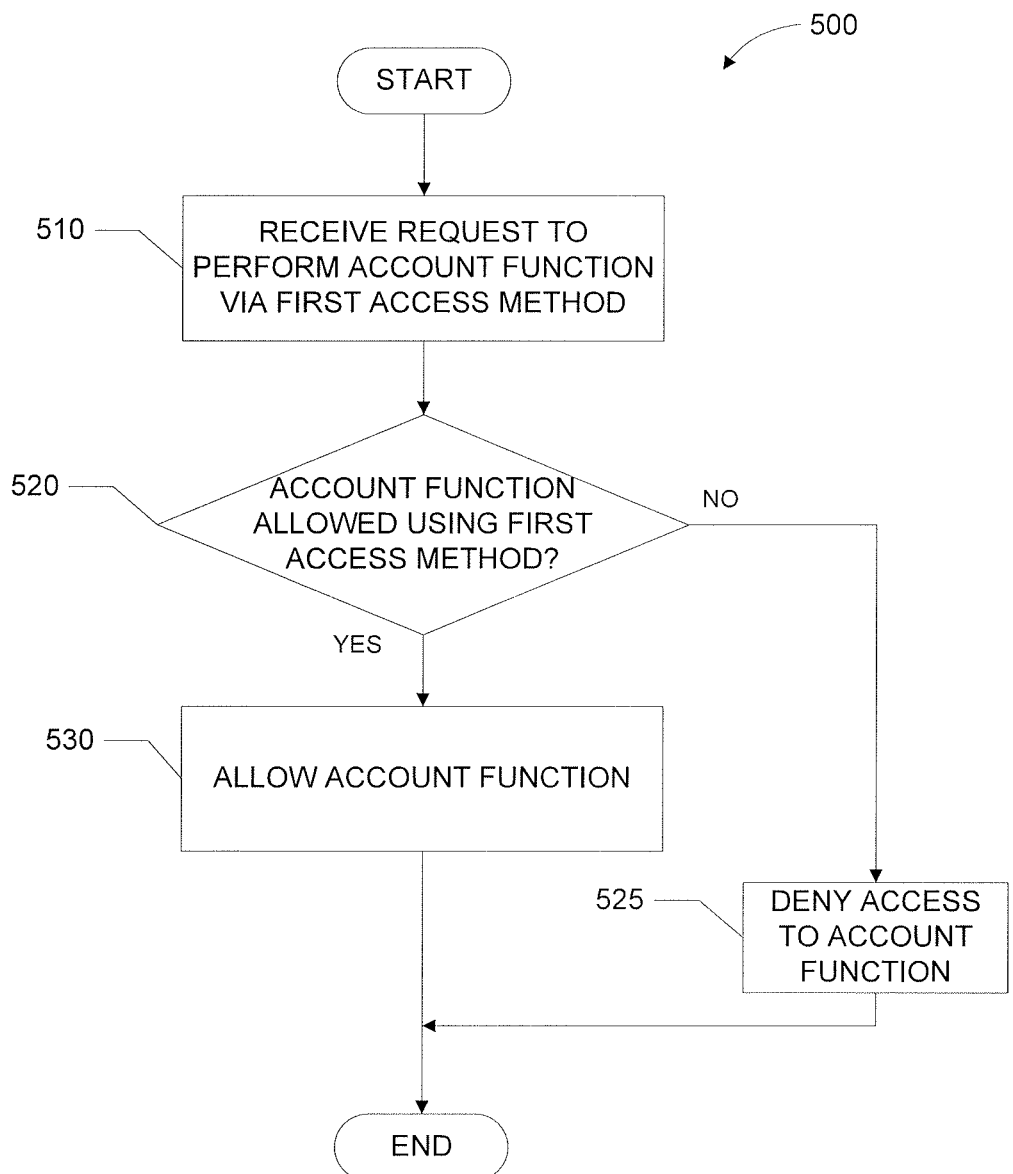
FIG. 5 illustrates an example method for performing functions associated with an online account in accordance with embodiments of the present disclosure.

FIG. 5 illustrates an example method 500 for performing functions associated with an online account in accordance with embodiments of the present disclosure. The method begins at step 510, where a request to perform a function associated with the online account is received via a first access method. The request may be received by a server that services the online account from a user device. For example, referring again to FIG. 3A, server 320 may receive a request to perform an account function from smartphone 310b via a short message system (SMS) text message. Based on the first access method account access rules associated with the online account, it is determined at step 530 whether the function associated with the online account may be performed using the first access method. If so, access to the account function is allowed at step 530. If not, access to the account function is denied at step 525. In certain embodiments, a notification may be provided that indicates whether access is restricted according to the account access rules (e.g., an "access denied" message or a notification similar to notification 313 of FIG. 3C).

Modifications, additions, or omissions may be made to method 500 without departing from the scope of the present disclosure. For example, the order of the steps may be performed in a different manner than that described and some steps may be performed at the same time. Additionally, each individual step may include additional steps without departing from the scope of the present disclosure.

Although the present disclosure includes several embodiments, changes, substitutions, variations, alterations, transformations, and modifications may be suggested to one skilled in the art, and it is intended that the present disclosure encompass such changes, substitutions, variations, alterations, transformations, and modifications as fall within the spirit and scope of the appended claims.

What is claimed is:

1. A system comprising:
a memory comprising instructions;
an interface configured to:
receive one or more account access rules, the account access rules comprising restrictions on accessing an online account through one or more access methods, wherein the restrictions are configured to restrict online account access during a defined time period, wherein the restrictions are configured to restrict accessing one or more content items associated with the online account, wherein the restrictions are further configured to restrict performing one or more account functions associated with the online account, wherein the account access rules further comprise at least a first set of rules and a second set of rules, wherein the first set of rules comprise restrictions configured to restrict mobile devices to viewing balances of the online account, wherein the second set of rules comprise restrictions configured to allow desktops to perform the one or more account functions on the online account, wherein the one or more account functions comprise at least one of the following:
transferring money;
paying bills; and
paying toward a credit card;
receive, via a first access method, a first request to access the online account;
receive, via the first access method, a second request to access a first content item associated with the online account; and
receive, via the first access method, a third request to perform an account function associated with the online account; and
a processor communicatively coupled to the memory and the interface, the processor configured, when executing the instructions, to:
determine, based on the account access rules, whether the online account may be accessed using the first access method;
determine whether the current time is within the defined time period in response to determining the online account may be accessed using the first access method;
determine, based on the first access method and the account access rules, whether the first content item may be accessed using the first access method;
determine, based on the first access method and the account access rules, whether the account function may be performed using the first access method; and
provide a visual depiction of the online account based on the one or more account rules in response to determining the current time is within the defined time period.

2. The system of claim 1, wherein:
the processor is further configured to determine, based on the first access method and the account access rules, whether access to the online account via the first access method is restricted; and
the interface is further configured to provide, in response to determining that that access to the online account via the first access method is restricted, a notification indicating that access to the online account is restricted.

3. The system of claim 1, wherein the one or more account access rules comprise restrictions on accessing the online account using mobile devices.

4. The system of claim 1, wherein the one or more account access rules comprise restrictions on accessing the online account through a mobile application.

5. The system of claim 1, wherein the one or more account access rules comprise restrictions on accessing the online account through a website.

6. A method, comprising:
receiving one or more account access rules, the account access rules comprising restrictions on accessing an online account through one or more access methods, wherein the restrictions are configured to restrict online account access during a defined time period, wherein the restrictions are configured to restrict accessing one or more content items associated with the online account, wherein the restrictions are further configured to restrict performing one or more account functions associated with the online account, wherein the account access rules further comprise at least a first set of rules and a second set of rules, wherein the first set of rules comprise restrictions configured to restrict mobile devices to viewing balances of the online account, wherein the second set of rules comprise restrictions configured to allow desktops to perform the one or more account functions on the online account, wherein the one or more account functions comprise at least one of the following:

transferring money;
paying bills; and
paying toward a credit card;
receiving, via a first access method, a first request to access the online account;
receiving, via the first access method, a second request to access a first content item associated with the online account;
receiving, via the first access method, a third request to perform an account function associated with the online account;
determining, based on the account access rules, whether the online account may be accessed using the first access method;
determining whether the current time is within the defined time period in response to determining the online account may be accessed using the first access method;
determining, based on the first access method and the account access rules, whether the first content item may be accessed using the first access method;
determining, based on the first access method and the account access rules, whether the account function may be performed using the first access method; and
providing a visual depiction of the online account based on the one or more account rules in response to determining the current time is within the defined time period.

7. The method of claim 6, further comprising:
determining, based on the first access method and the account access rules, whether access to the online account via the first access method is restricted; and
providing, in response to determining that that access to the online account via the first access method is restricted, a notification indicating that access to the online account is restricted.

8. The method of claim 6, wherein the one or more account access rules comprise restrictions on accessing the online account using mobile devices.

9. The method of claim 6, wherein the one or more account access rules comprise restrictions on accessing the online account through a mobile application.

10. The method of claim 6, wherein the one or more account access rules comprise restrictions on accessing the online account through a website.

11. A non-transitory computer-readable medium comprising instructions that are configured, when executed by a processor, to:
receive one or more account access rules, the account access rules comprising restrictions on accessing an online account through one or more access methods, wherein the restrictions are configured to restrict online account access during a defined time period, wherein the restrictions are configured to restrict accessing one or more content items associated with the online account, wherein the restrictions are further configured to restrict performing one or more account functions associated with the online account, wherein the account access rules further comprise at least a first set of rules and a second set of rules, wherein the first set of rules comprise restrictions configured to restrict mobile devices to viewing balances of the online account, wherein the second set of rules comprise restrictions configured to allow desktops to perform the one or more account functions on the online account wherein the one or more account functions comprise at least one of the following:
transferring money;
paying bills; and
paying toward a credit card;
receive, via a first access method, a request to access the online account;
receive, via the first access method, a second request to access a first content item associated with the online account;
receive, via the first access method, a third request to perform an account function associated with the online account;
determine, based on the account access rules, whether the online account may be accessed using the first access method;
determine whether the current time is within the defined time period in response to determining the online account may be accessed using the first access method;
determine, based on the first access method and the account access rules, whether the first content item may be accessed using the first access method;
determine, based on the first access method and the account access rules, whether the account function may be performed using the first access method; and
provide a visual depiction of the online account based on the one or more account rules in response to determining the current time is within the defined time period.

12. The computer-readable medium of claim 11, wherein the instructions are further configured to:
determine, based on the first access method and the account access rules, whether access to the online account via the first access method is restricted; and
provide, in response to determining that that access to the online account via the first access method is restricted, a notification indicating that access to the online account is restricted.

13. The computer-readable medium of claim 11, wherein the one or more account access rules comprise restrictions on accessing the online account using mobile devices.

14. The computer-readable medium of claim 11, wherein the one or more account access rules comprise restrictions on accessing the online account through a mobile application.

* * * * *